United States Patent [19]
McCorkle et al.

[11] Patent Number: 5,127,782
[45] Date of Patent: Jul. 7, 1992

[54] SELF-LOCKING, CASTELLATED LOCKNUT

[75] Inventors: Daniel J. McCorkle; Fernando R. De la Fuente, both of Irvine; Albert L. Worthing, Tustin, all of Calif.

[73] Assignee: Shur-Lok Corporation, Irvine, Calif.

[21] Appl. No.: 720,903

[22] Filed: Jun. 25, 1991

[51] Int. Cl.⁵ .............................................. F16B 39/22
[52] U.S. Cl. .................................... 411/280; 411/266
[58] Field of Search ............ 411/266, 280, 222, 223, 411/239, 242, 268, 281, 931, 269, 937, 937.1, 937.2

[56] References Cited

U.S. PATENT DOCUMENTS

| | | | |
|---|---|---|---|
| 1,010,264 | 11/1911 | Jacques, Jr. | 411/931 X |
| 1,603,901 | 10/1926 | Brownlee | 411/937.1 X |
| 2,316,684 | 4/1943 | Gade | 411/280 |
| 2,381,110 | 8/1945 | Chandler | 411/280 |
| 3,142,325 | 7/1964 | Swanstrom | 411/937.1 X |
| 3,683,989 | 8/1972 | Follstaedt et al. | 411/937.1 X |
| 4,890,965 | 1/1990 | Dietlein | 411/280 |

FOREIGN PATENT DOCUMENTS

| | | | |
|---|---|---|---|
| 1802372 | 5/1969 | Fed. Rep. of Germany | 411/280 |
| 21878 | 10/1920 | France | 411/280 |
| 674091 | 1/1930 | France | 411/280 |
| 902278 | 8/1945 | France | 411/280 |
| 929985 | 1/1948 | France | 411/280 |
| 1091288 | 4/1955 | France | 411/268 |
| 2396199 | 1/1979 | France | 411/280 |
| 1296887 | 11/1972 | United Kingdom . | |

*Primary Examiner*—Rodney M. Lindsey
*Attorney, Agent, or Firm*—Price, Gess, Ubell

[57] ABSTRACT

A castellated locknut having an annular ring and a set of castellations, wherein the castellations are tapered to provide a locking mechanism. The locknut is provided with a circumferential groove formed between the castellations and the annular body which ensures that the castellations have equal base cross-sectional areas, such that the castellations deflect uniformly upon mounting to a shaft. Further, the provision of the circumferential groove renders the annular ring torsionally flexible as compared to the flexural stiffness of the castellations. Upon mounting to a shaft, the annular ring of the locknut elastically and torsionally deflects, thus allowing the castellations to pivot clear of the shaft without undesirable inelastic deformation. Accordingly, a precise and uniform locknut having an effective locking mechanism is achieved. In an alternative embodiment, the castellations are not tapered; rather the castellations are bent radially by the application of a load prior to mounting to a shaft such that, upon mounting to the shaft, a locking interference is achieved.

17 Claims, 8 Drawing Sheets

SELF-LOCKING, CASTELLATED LOCKNUT

BACKGROUND OF THE INVENTION

1. Field of the Invention

The subject invention relates generally to castellated locknuts and, more particularly, to an improved castellated locknut structure capable of precise and uniform manufacture and having a thread locking element which is capable of long-term reuse without wear or damage. Hereinafter, castellations shall be referred to alternatively as either castellations or locking members.

2. Description of Related Art

For many years, the fastener manufacturing industry has produced a variety of internally threaded, self-locking locknuts designed to securely engage a threaded shaft. Such self-locking locknuts typically use a thread locking feature which interferes with free rotation of the locknut on the shaft. Means most commonly employed to achieve such interference include locking members which engage the shaft such that, as the locknut is rotated onto the shaft, the locking member is deflected or deformed, permitting forced rotation of the locknut onto the shaft. Resistance within the locking member to the deflection or deformation provides a frictional force between the locknut and the shaft which must be subsequently overcome if the locknut is to further rotate with respect to the shaft.

By "deflection," it is meant that an elastic bending occurs within the locknut such that, upon removal of the locknut from the shaft, the locknut returns to its initial state. In contrast, by "deformation," it is meant that an inelastic bending occurs within the locknut such that, upon removal of the locknut from the shaft, the locknut does not return to its initial state.

Deflection of a locking member is the preferred means for achieving a locking interference, since such a locking member can be reused without any loss in performance.

Four types of locknut structures are well known in the prior art. In the first such structure, commonly called a beam-lock structure, a locknut is provided with a plurality of closely spaced fingers or flexures extending parallel with the axis of the locknut. The flexures are initially deformed along their length toward the axis of the locknut. The flexures include discontinuous threads which engage a shaft. The flexures are deformed or deflected with respect to the body of the locknut as the locknut is inserted onto the shaft.

Beamlock locknuts are frequently limited to having small thread sizes of fine thread pitch. Small variations allowed by thread design specifications in the manufacture of these small-diameter threads limit the required deflection of the flexures necessary to the development of a thread lock. This limited deflection can be accommodated by the beamlock flexures. However, the beamlock structure has disadvantages where large variations are permitted to occur in either or both of the shaft thread and the locknut thread. In particular, large variations require large flexure displacement which, in turn, results in plastic deformation of the flexures and resultant degradation of the thread lock. Also, initial deformation of the flexures with any measure of precision is difficult to accomplish.

A second commonly-known locking structure incorporates a standing collar integral to the top of a locknut through which the thread of the locknut passes. The locknut collar, initially round, is deformed to distort the internal threads, thus creating local interference, friction, and resulting thread lock. The areas of interference in the integral collar are quite small, and, in use, are subject to high stress and resultant wear. Consequently, a locknut constructed according to this method is difficult to produce with precision and tends to degrade rapidly when in use.

A third commonly-known locknut structure incorporates a stricture in the form of a ring or patch of plastic or other nonmetallic material. The stricture functions in the same way as the flexure or deformed threads of the above-described structures by creating an interference with the shaft thread. The nonmetallic locking stricture, however, does not behave elastically, but rather, elastoplastically and, consequently, is prone to wear and degradation when used. Furthermore, the nonmetallic structure can withstand only limited elevated temperatures and, consequently, has limited use in applications requiring high temperatures.

A fourth conventional locknut structure includes a series of widely-spaced castellations, which are integrally formed on the body of the locknut. The castellations are directed parallel to the axis of the locknut, include thread segments, and are bent, subsequent to machining, toward the axis of the locknut. As the locknut is mounted externally to a shaft, the castellations are disposed outwardly as a cantilevered beam. Resistance to displacement produces a thread lock.

The castellated locknut differs from the beamlock locknut described above, in that the castellations are more robust than the flexures of the beam-lock locknut; i.e., the castellations have a greater cross-sectional area. Consequently, the castellations are rigid as compared to the flexures of the beam-lock locknut. Accordingly, the load required to initially bend the castellations toward the axis of the locknut is substantial and, consequently, is difficult to control with precision.

Slots cut into the locknut to produce the castellations interrupt the thread of the locknut and can produce heavily burred threads, particularly at the base of each castellation, which require laborious hand deburring. Furthermore, because the thread is helical, thread segments on the castellations are formed at circumferentially varying distances from the base of the castellations. As a result, adjacent castellations do not have equal cross-sectional base areas. Therefore, adjacent castellations are not deformed equally when subjected to equal loads. This further compromises the performance of the locknut.

Examples of such locknut structures are found in British Patent No. 1,296,887 and U.S. Pat. No. 4,890,965.

Briefly summarizing the disadvantages of the prior art structures, beam-lock locknuts are limited to having small thread sizes, and the deformation of flexures is difficult to control with precision; locking collar structures are subject to wear and degradation, and the process by which the deformation is produced is likewise difficult to control with precision; nonmetallic structures lack durability and are temperature-sensitive; conventional castellated locknut structures are subject to shaft thread damage and wear, lack durability, and are also difficult to produce with precision; and, finally, all include locking features having only a limited capacity to elastically deflect before inelastic deformation occurs, which limits the reusability of the locknut.

SUMMARY OF THE INVENTION

It is therefore an object of the present invention to provide an improved castellated locknut;

It is another object of the invention to provide a castellated locknut capable of precise and uniform manufacture;

It is a further object of the invention to provide a castellated locknut which does not require extensive hand deburring after manufacture; and It is still another object of the invention to provide a castellated locknut which is durable and, in particular, is resistant to thread wear.

These and other objects and advantages of the present invention are achieved by providing a locknut having an annular body, castellations having base ends integrally formed with a first end of the body, the castellations extending axially from the body, a helical thread formed along a portion of the body excluding the first end, helical thread segments formed along a portion of the castellations excluding the base ends, and a first groove formed between the helical thread of the body and the helical thread segments of the castellations.

Preferably, the locknut also includes second grooves formed on the castellations on sides thereof opposite the helical thread segments.

In accordance with one embodiment, the castellations have tapered thread segments such that, upon mounting to a shaft, a locking interference occurs between the tapered thread segments and the shaft. In this embodiment, a locking interference is achieved solely from the configuration of the thread segments as initially formed.

In accordance with an alternative embodiment of the invention, castellations are deformed by the application of a load, such that free ends thereof are radially offset from the axis of the locknut such that a locking interference is achieved upon the subsequent mounting of the locknut to a shaft.

In either embodiment, by providing the first groove along the base of the castellations and thereby eliminating thread segments from the base of the castellations, uniform castellation base cross-sectional areas are achieved, such that the castellations uniformly deflect when mounted to a shaft. Further, the first groove provides that the flexural stiffness of the castellations, as compared to the torsional stiffness of the locknut, is such that the castellations deflect primarily through an elastic toroidal displacement of the annular body of the locknut, rather than through bending of each castellation along its base. This is particularly advantageous, since the annular body of the locknut allows a greater amount of elastic deflection than do the castellations and, therefore, the locknut has a highly effective locking interference and a long life.

Further, the locking members can be uniformly deflected through a greater angle and with a greater degree of precision than attainable in the prior art.

A more complete summary of the advantages of the invention follows.

In general, in a castellated locknut an interference is generated between locking members provided on the locknut body and a threaded shaft upon which the locknut is mounted. The interference results in friction which, in turn, results in resistance against undesired rotation of the locknut or the shaft.

A conventional locknut is manufactured and castellated with the locking members extending axially. Subsequently, the castellations are inelastically deformed by the application of load such that a permanent angled deformation is achieved which provides the interference required to develop a desired "locking torque."

Three modes of deflection occur within a castellated locknut upon mounting to a shaft: flexure of the castellations as cantilevered beams, radial expansion of the locknut, and torsional deflection of the locknut body as a toroid.

The present invention in all embodiments exploits the third mode of deformation; i.e., torsional deflection of the locknut body as a toroid, and minimizes the first and second forms of deflection. To this end, the invention separates the thread segments of the locking members and the thread of the locknut body and provides a groove formed therebetween.

The provision of the groove renders the base of the locking members of equal stiffness flexurally, thus allowing the castellations to deflect equally.

Further, the flexural stiffness of the locking members and the ring stiffness of the locknut body are at least an order of magnitude stiffer than the torsional stiffness of the locknut body.

Accordingly, in the first embodiment discussed above, as the locknut with tapered castellations is mounted to a shaft, a radial reactive force acts upon the tapered castellations, tending to displace the members radially, while the locknut ring deflects torsionally, allowing the locking members to pivot clear of the entering shaft, and permitting the shaft to pass through the nut.

In the alternative embodiment discussed above, as the locknut with tilted castellations is mounted to a shaft, an identical toroidal deflection of the annular body occurs.

In either embodiment, since elastic deflection occurs in the relatively flexible locknut ring, rather than in the relatively stiff locking members, a greater angle of elastic deflection is achieved without inelastic deformation.

The larger permissible variations by specification associated with a coarser thread pitch can be accommodated by the locking members. Also, since the deformation associated with bending the locking members is easier to accomplish, the deformation can be performed with greater precision and uniformity.

Also, by using only metallic materials in the locknut, the temperature range in which the locknut can be used is greatly extended, compared to locknuts having nonmetallic materials.

The preferred embodiment has the further advantage that, since the locking members need not be tilted subsequent to machining, additional cost savings are realized.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the castellated locknut art to make and use the invention and sets forth the best modes contemplated by the inventors of carrying out their invention. Various modifications, however, will remain readily apparent to those skilled in these arts, since the generic principles of the present invention have been defined herein specifically to provide an improved castellated locknut.

Referring to FIGS. 1-5, a locknut 10 is shown therein having an annular body or ring 12 with ends 24 and 26. A series of integral castellations 14 are formed on end 24 and extend parallel to an axis of the locknut. Eight such castellations are shown in the figures. Of course, as will be understood by those skilled in the art, more castellations or fewer castellations can be formed. Preferably three to twelve such castellations are used. Also as shown, the castellations are preferably equally spaced along the circumference of base ring 12.

Figure 1:
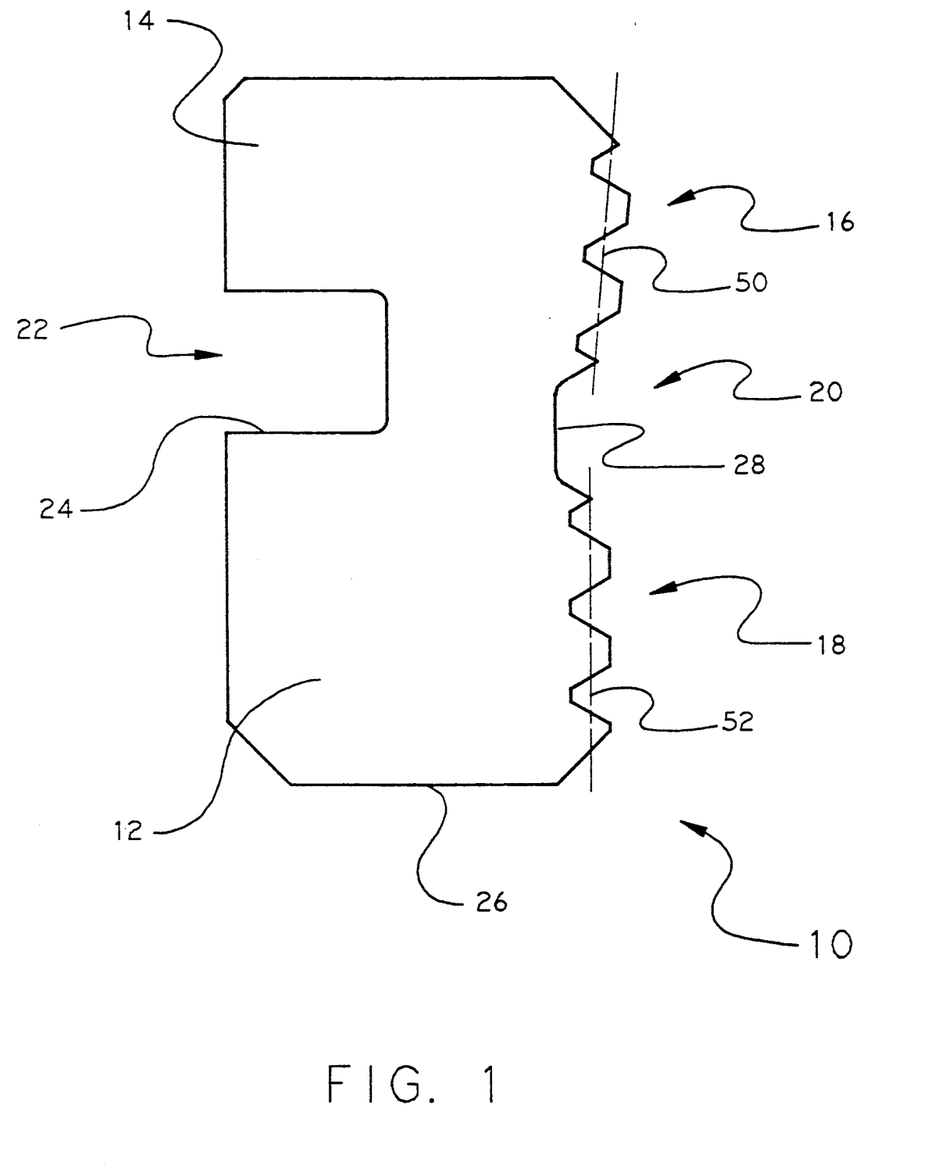
FIG. 1 is an illustrated schematic of a locknut formed in accordance with a preferred embodiment of the invention and having tapered threads.
Figure 2:
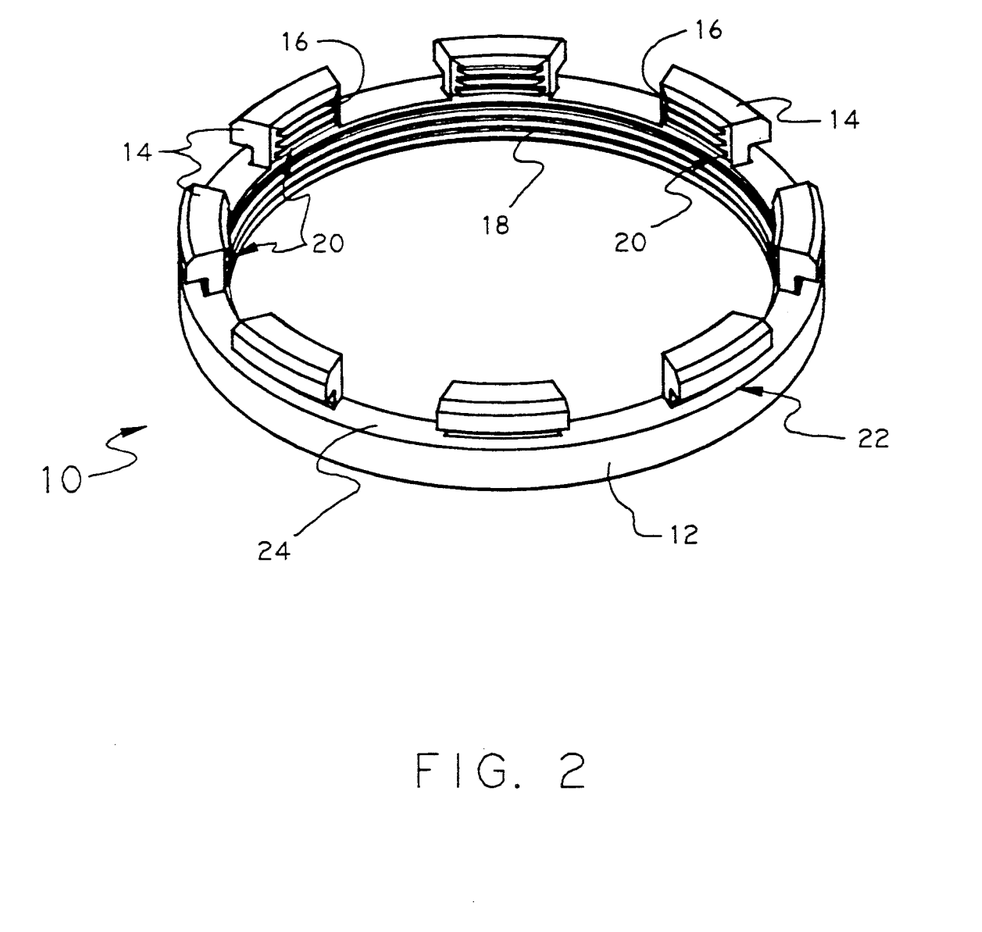
FIG. 2 is a perspective view of the locknut of FIG. 1.

Ring 12 is internally threaded with one continuous helical thread 18. Continuous thread 18 extends from end 26 to a position intermediate end 24. Thus, continuous thread 18 does not extend to the base of castellations 14.

Each individual castellation 14 is provided with a series of tapered thread segments 16 formed on the interior surface thereof facing the central axis of locknut 10. Thread segments 16 of adjacent castellations 14 are aligned with each other and with continuous thread 18 such that a continuous helical thread is defined.

Thread segments 16 extend from the free ends of castellations 14 to positions along the internal face of the castellations intermediate the free ends and the base ends. Thus, thread segments 16 do not extend to end 24 of locknut ring 12.

As can be seen from FIG. 1, the pitch diameter of continuous thread 18 is constant along the axis of locknut 10. However, the pitch diameter of thread segments 16 varies linearly along the axis, with the thread segments nearest the bases of locking members 14 having a larger pitch diameter than the thread segments nearest the free ends of locking members 14. Thus, thread segments 16 are angled or tapered with respect to the axis of locknut 10. Tapered threads are produced by means such as a computer numerical controlled (CNC) turning machine.

Figure 3:
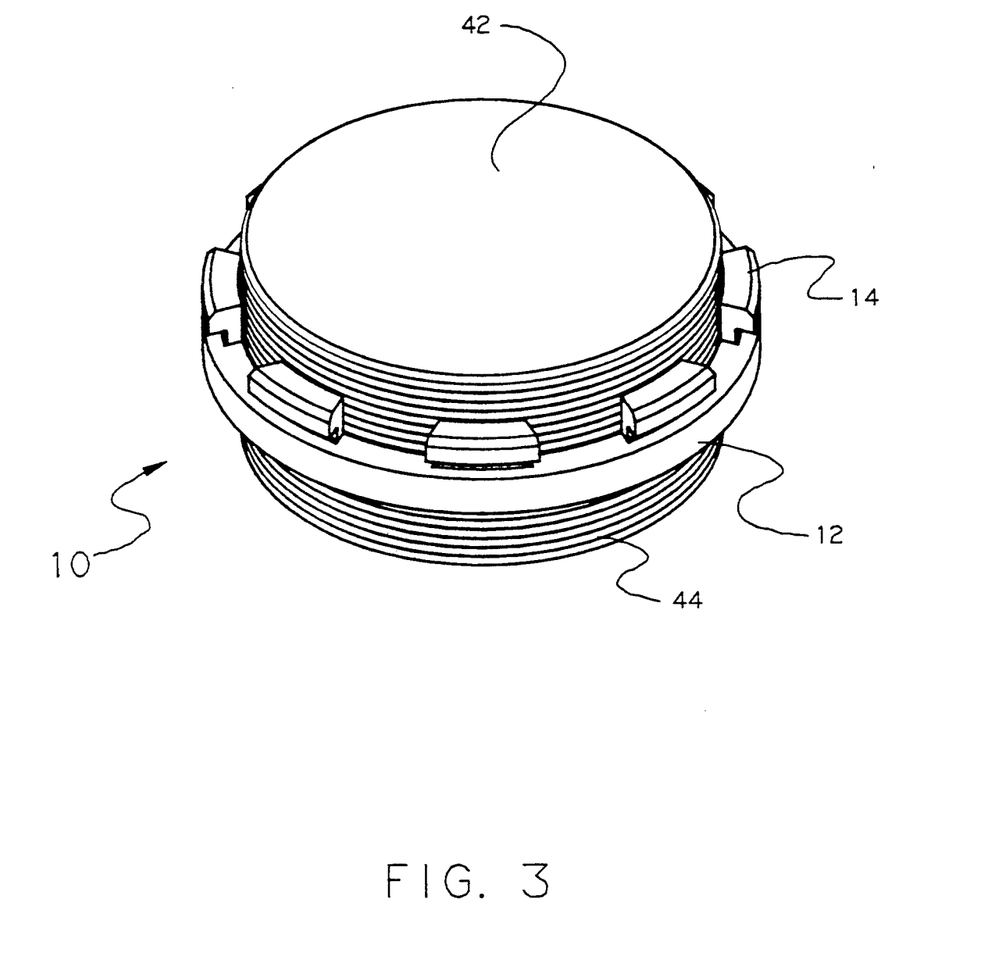
FIG. 3 is a perspective view of the locknut of FIG. 1 mounted to a shaft.
Figure 4:
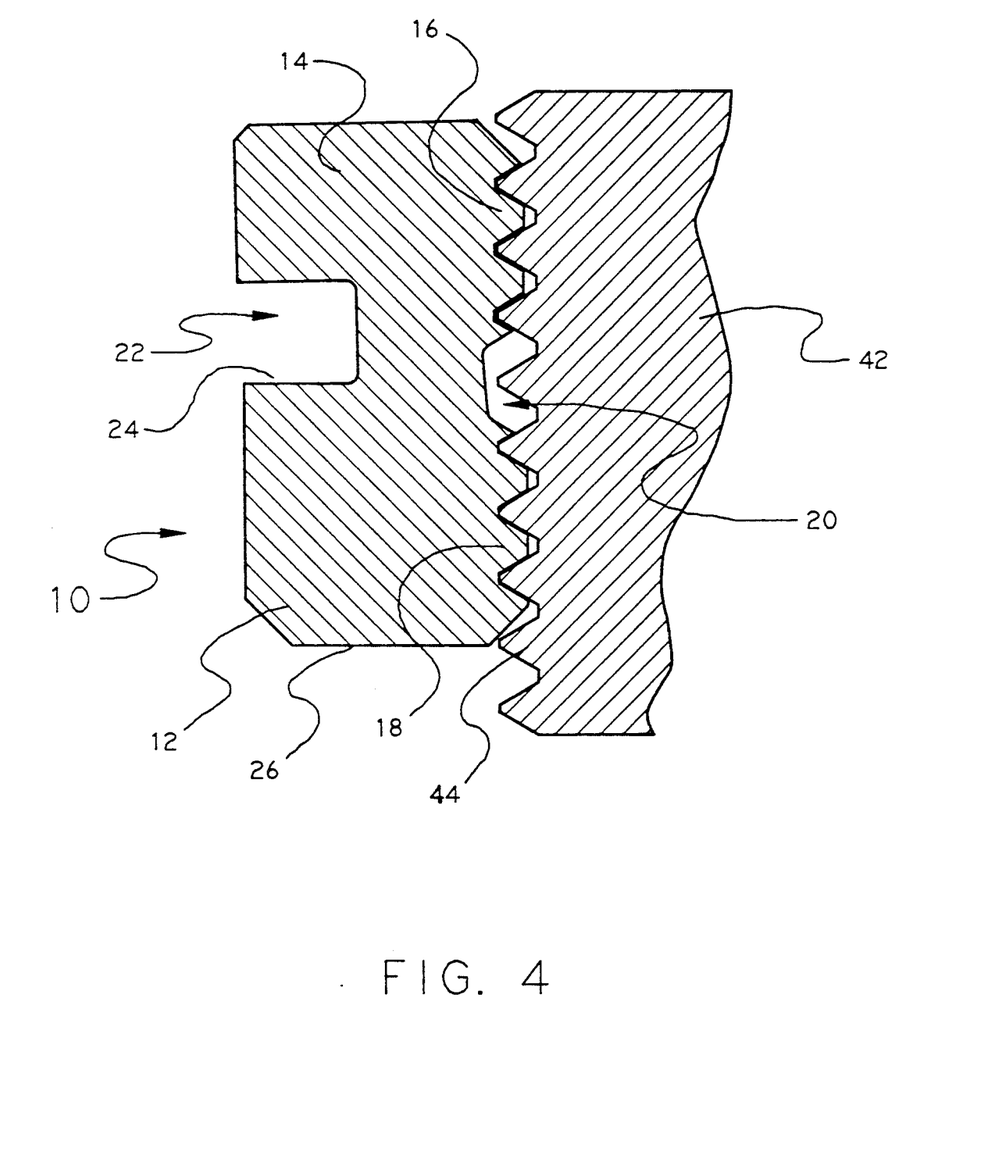
FIG. 4 is an illustrated schematic of the locknut and shaft of FIG. 3.

Locknut 10 is used in the same manner as locknuts of the prior art; i.e., locknut 10 is mounted on a shaft 42 shown in FIGS. 3 and 4. As locknut 10 is mounted on shaft 42, internal threads 18 of base ring 12 engage external threads 44 of the shaft. Subsequently, internal thread segments 16 of castellations 14 likewise engage the external thread 44 of the shaft. However, since castellations 14 are tapered toward the axis of locknut 10, interference and friction is formed as thread segments 16 engage external threads 44. This interference or friction secures the locknut to the shaft such that the locknut cannot freely or easily rotate with respect to the shaft.

Referring again to FIG. 1, a groove or undercut 20 is provided along the internal face of locknut 10 between continuous thread 18 and castellation thread segments 16. Groove 20 is preferably formed in the shape of an isosceles trapezoid symmetric about a plane defined by end 24 of ring 12. Thus, trapezoidal groove 20 extends along a portion of the internal surface of ring 12, as well as along a portion of the internal surface of each castellation 14.

Interior base length 28 of trapezoidal groove 20 is preferably formed to a length of one to one and one-half times the pitch of thread 16. The diameter of groove 20 is preferably slightly larger than the maximum major diameter of thread 16.

Also as shown in FIG. 1, a rectangular groove 22 is preferably provided on the exterior surface of locknut 10. Rectangular groove 22 extends from end 24 of ring 12 along the outside of castellations 14 to a position intermediate ring 12 and the free ends of castellations 14.

External rectangular groove 22 and internal trapezoidal groove 20 together narrow the thickness of the bases of castellations 14 and optimize the flexural stiffness of castellations 14 relative to the torsional stiffness of ring 12.

Figure 5:
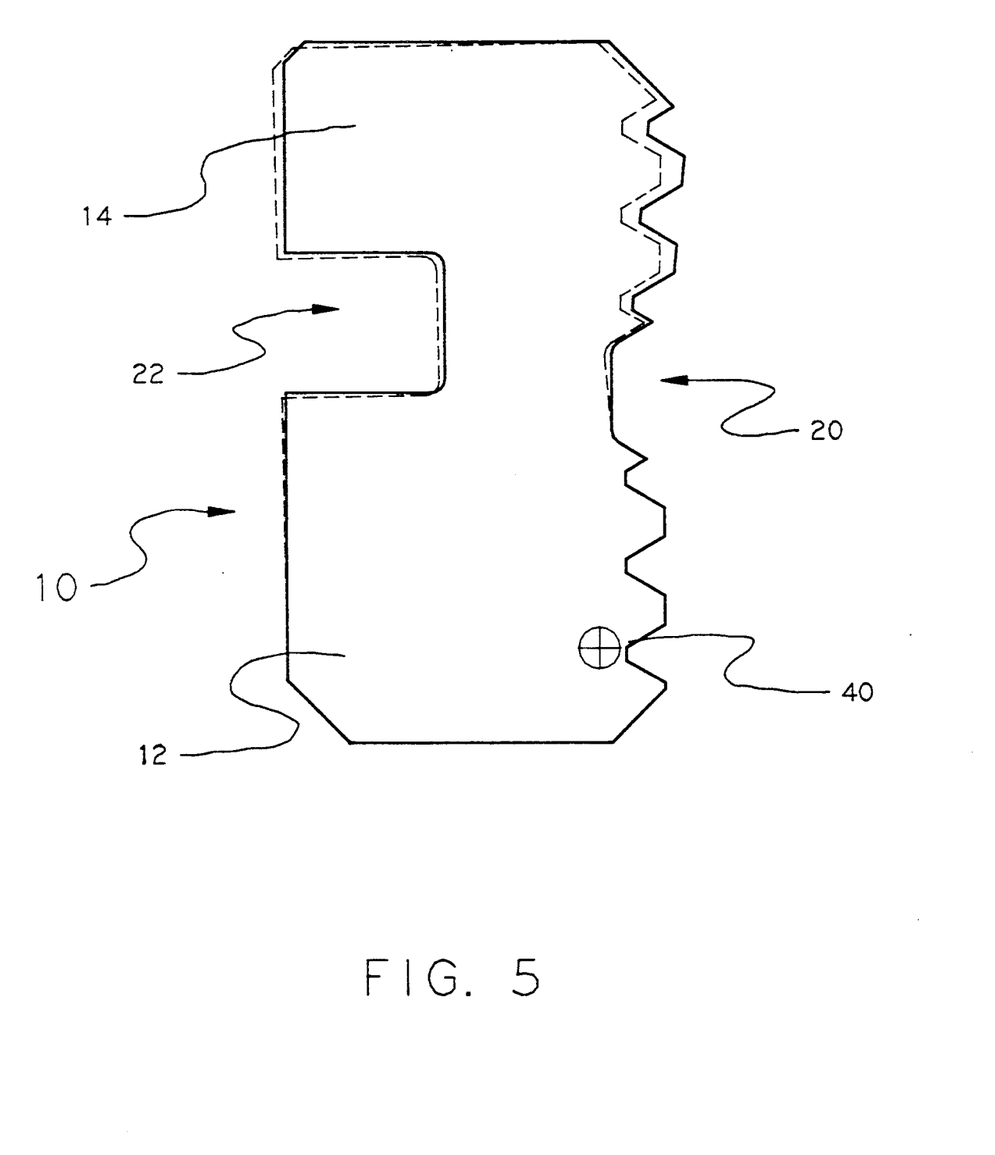
FIG. 5 is an illustrated schematic of the embodiment of FIG. 1, showing a torsional deflection of the locknut in broken lines.

With the provision of groove 20, during mounting of locknut 10 onto a shaft, castellations 14 do not bend or deform along their length; rather, as shown in FIG. 5, locknut 10 deflects toroidally such that each castellation pivots about a point 40 located near the intersection of the end 26 and the threaded inside surface of the locknut. This is in contrast to prior art described above, wherein castellations deform, i.e., the castellations of the prior art bend along their length. For clarity, the deflection of locknut 10 is exaggerated in FIG. 5.

Thus, the primary mode of deflection of locknut 10 is within ring 12 rather than within castellations 14. Torsional deflection of ring 12 is more uniform and can be produced more precisely than individual deformations of castellations 14.

Specifications for locknut 10 are provided in Tables I and II.

TABLE I

| Thread size | Tensile strength (Lbs.) | Max locking torque (In-Lbs.) | Min locking torque (In-Lbs.) |
|---|---|---|---|
| 2.157-18 UN | 61,000 | 805 | 120 |
| 2.360-18 UN | 67,000 | 860 | 130 |
| 2.548-18 UN | 72,000 | 895 | 138 |
| 2.751-18 UN | 78,000 | 950 | 145 |
| 2.933-12 UN | 136,000 | 985 | 155 |
| 3.137-12 UN | 145,000 | 1030 | 160 |
| 3.340-12 UN | 155,000 | 1070 | 170 |
| 3.527-12 UN | 164,000 | 1100 | 178 |
| 3.730-12 UN | 174,000 | 1145 | 185 |
| 3.918-12 UN | 182,000 | 1175 | 190 |
| 4.122-12 UN | 192,000 | 1200 | 200 |
| 4.325-12 UN | 202,000 | 1230 | 205 |

TABLE II

| Thread size | Tensile strength (Lbs.) | Max locking torque (In-Lbs.) | Min locking torque (In-Lbs.) |
| --- | --- | --- | --- |
| 2.000-16 UNJ-3B | 68,000 | 765 | 110 |
| 2.250-16 UNJ-3B | 77,000 | 825 | 120 |
| 2.500-16 UNJ-3B | 86,000 | 890 | 135 |
| 2.750-16 UNJ-3B | 94,000 | 950 | 145 |
| 3.000-16 UNJ-3B | 103,000 | 1000 | 155 |
| 3.250-16 UNJ-3B | 112,000 | 1050 | 165 |
| 3.500-16 UNJ-3B | 120,000 | 1100 | 175 |
| 3.750-16 UNJ-3B | 129,000 | 1150 | 185 |
| 4.000-16 UNJ-3B | 138,000 | 1200 | 195 |

Tables I and II provide tensile strength and maximum and minimum locking torque for various thread sizes for the locknut. Thread sizes of Table I are designated according to IAW ANSI/AFBMA Standard 8.2. Thread sizes of Table II are designated according to military specification MIL-S-8879. Tensile strength is provided for reference purposes only. The locking torques provided in Tables I and II are based on the following test conditions: lubrication according to military specification MIL-L-7808; shaft tensile strength of 180 ksi (180,000 psi) minimum, and with the shaft being composed of the same material as that of the locknut. Performance under other conditions may differ.

By providing for equal cross-sectional base areas of castellations 14 and by exploiting the relatively low torsional stiffness of the locknut ring, the invention allows for greater reuse of the locknut.

Figure 6:
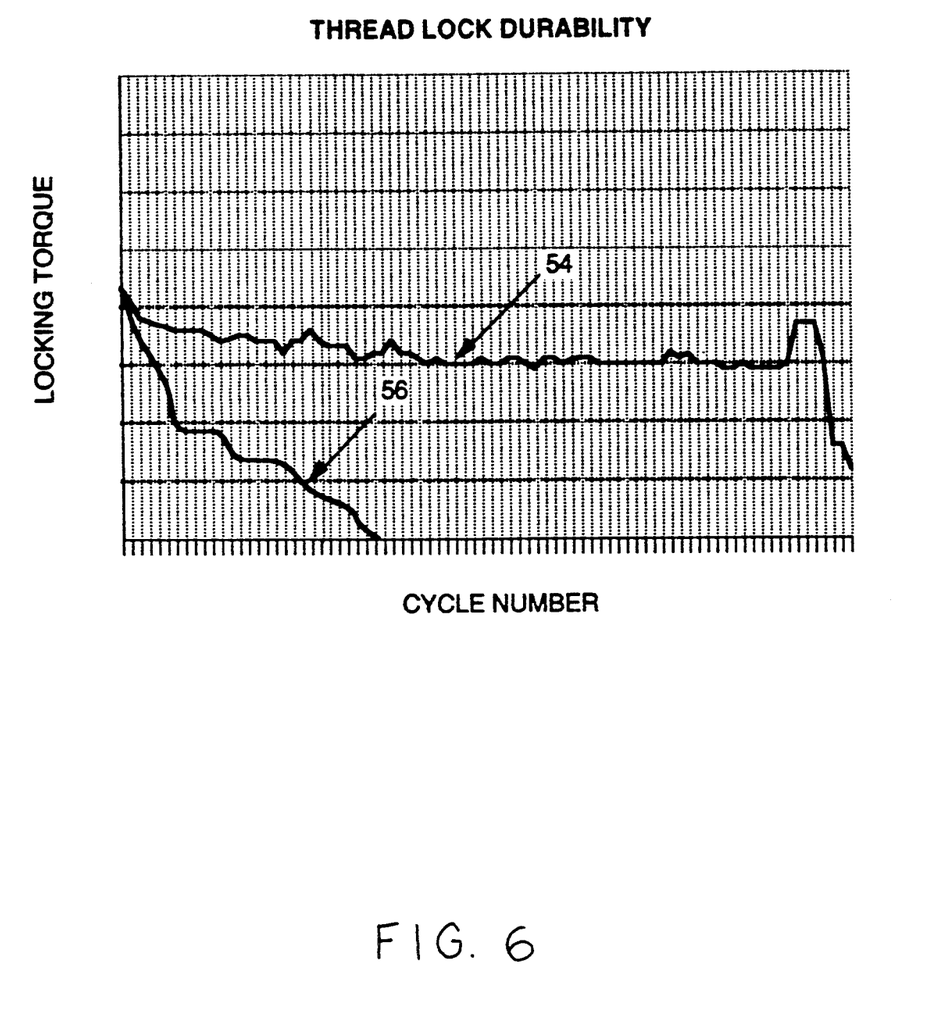
FIG. 6 is a graph showing thread lock durability of the embodiment of FIG. 1.

The durability of locknut 10 is shown in FIG. 6, which provides a graph of locking torque in units of inch-pounds as a function of cycle number, i.e., the number of reuses.

As can be seen from FIG. 6, locknut 10 maintains a substantially constant locking torque despite a large number of cycles.

Locknut 10, as shown in FIGS. 1 through 5, is constructed of typical locknut materials such as steel with silver electroplating.

Locknut 10 described thus far includes threads 18 and tapered thread segments 16 provided on the internal surface of the locknut. Of course, as will be understood by those skilled in the art, threads 18 and thread segments 16 can be formed on the exterior surface of locknut ring 12 and castellations 14 such that locknut 10 is internally mountable within a housing.

Figure 7:
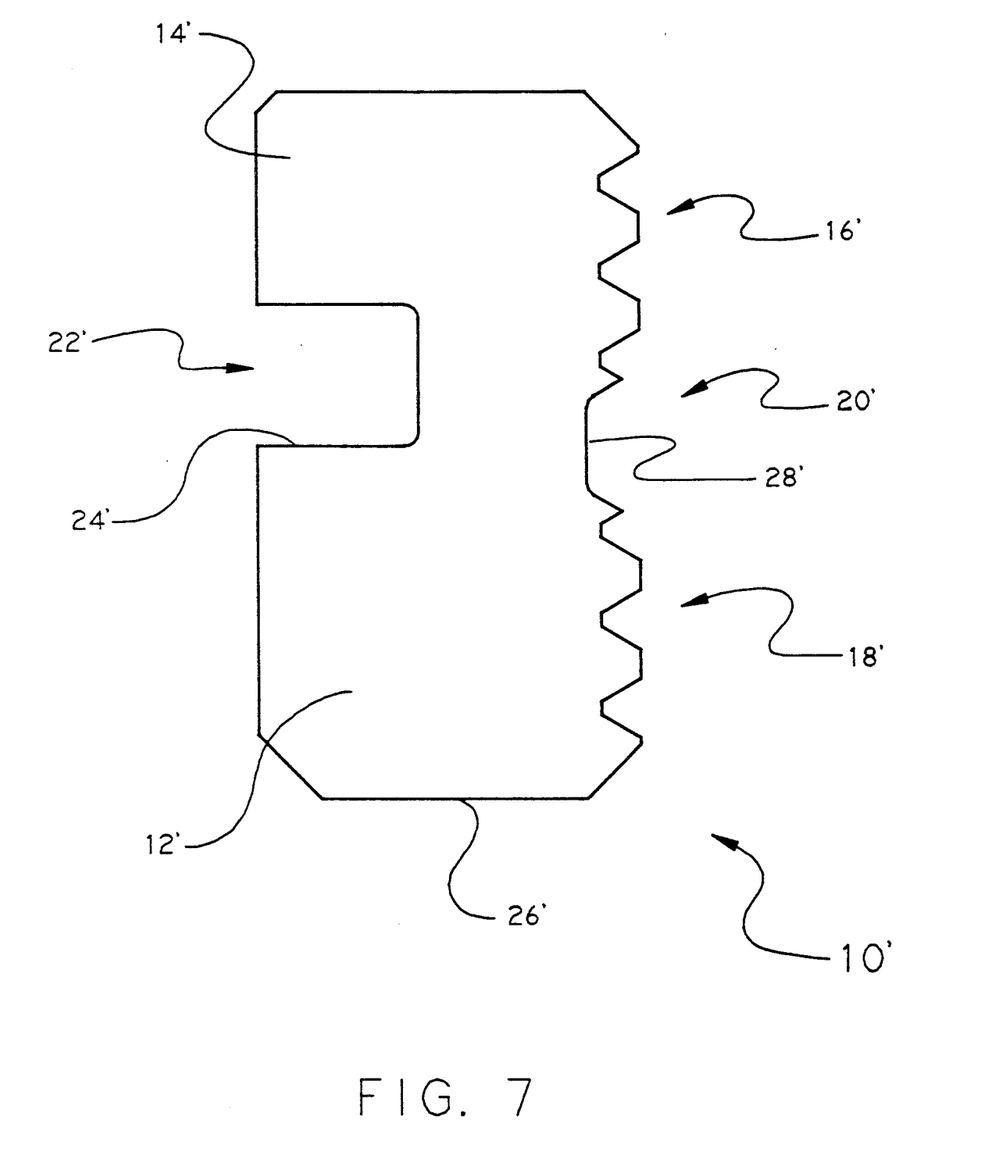
FIG. 7 is an illustrated schematic of an alternative embodiment of the invention having nontapered threads.
Figure 8:
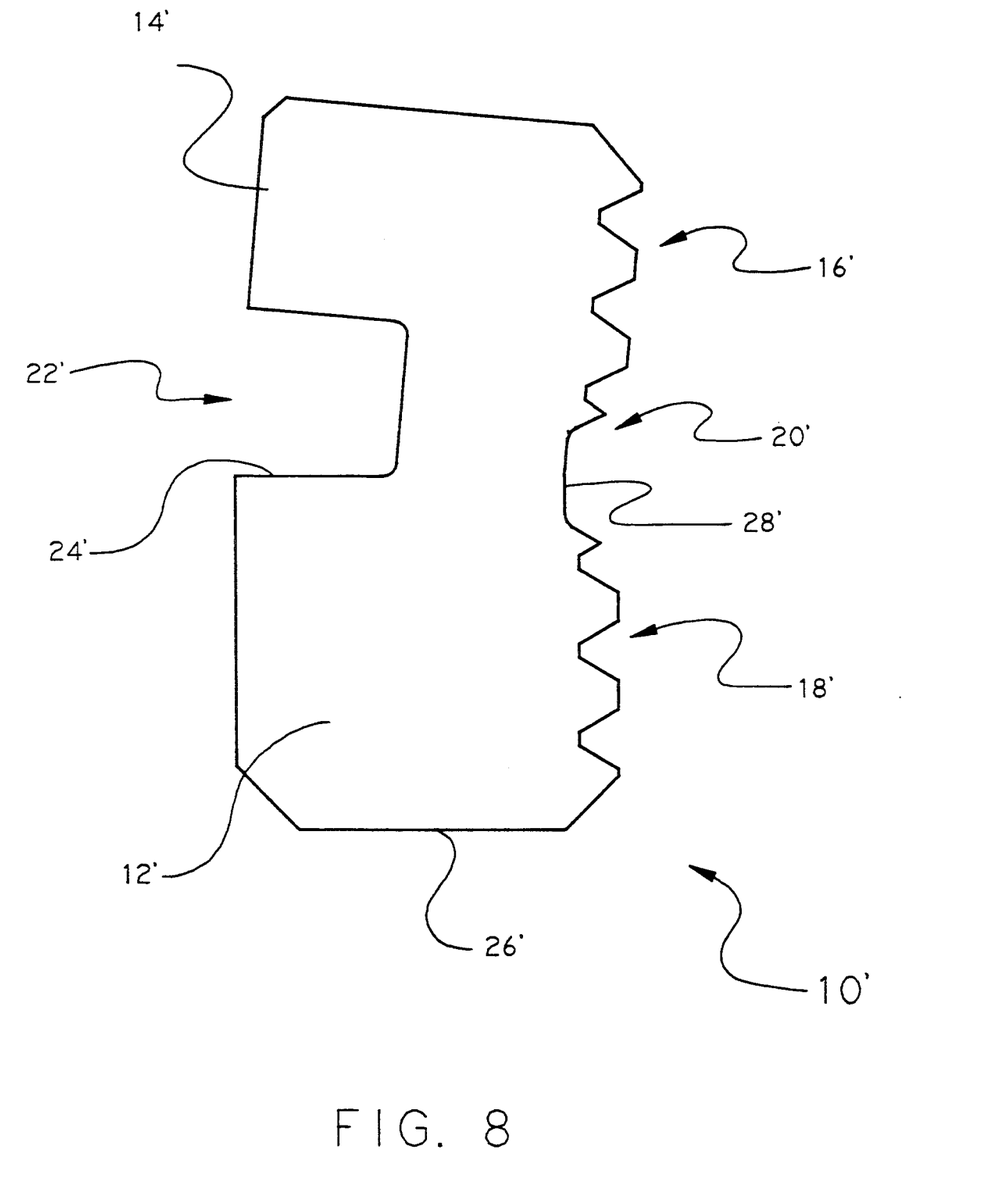
FIG. 8 is an illustrated schematic of the alternative embodiment of FIG. 7 in final form, i.e., with castellations deformed to produce locking interference.

Referring to FIGS. 7 and 8, an alternative embodiment of the invention is shown. The embodiment of FIG. 5 is similar to the embodiment of FIGS. 1-5, with like elements represented by the same reference numerals with primes attached.

Locknut 10' of FIG. 1 is identical to locknut 10 of FIGS. 1-5 except that thread segments 16' are not tapered. Rather, locknut 10, as initially constructed, includes thread 18' and thread segments 16' of uniform pitch diameter.

However, subsequent to manufacture, castellations 14' are bent toward the locknut axis; i.e., castellations 14' are permanently deformed to tilt toward the locknut axis. The bending or tilting of castellations 14' is accomplished by conventional means.

In use, locknut 10' with tilted castellations 14' is mounted to a shaft (not shown). As thread segments 16' engage complementary threads on the shaft, castellations 14' are deflected outwardly, resistance to which produces a locking interference.

Locknut 10' is shown in FIG. 8 in its operational form with castellations 14' rigidly bent inward. For clarity, the deformation of locknut 10' is exaggerated in FIG. 7.

As with the embodiment previously described, grooves 20' and 22' provide for equal base cross-sectional areas of castellations 14', thus allowing the castellations to be deflected uniformly. Also, grooves 20' and 22' establish the base thickness of castellations 14' such that an elastic torsional toroidal deflection of the locknut occurs upon mounting to a shaft, rather than an inelastic deformation of the castellations themselves.

Finally, with regard to the embodiment of FIGS. 7 and 8, it can be configured either for internal or external mounting onto a shaft or into a housing.

While the above features of the present invention teach an improved castellated locknut, it can be readily appreciated that it would be possible to deviate from the above embodiments of the present invention and, as will be readily understood by those skilled in the art, the invention is capable of many modifications and improvements within the scope and spirit thereof. Accordingly, it is to be understood that the invention is not to be limited by the specific embodiments but only by the spirit and scope of the appended claims.

What is claimed is:

1. A locknut comprising:
    an annular body defining an axis, the annular body having a helical thread formed along a portion of its axial length;
    rigid castellations projecting generally axially from a first end of the annular body, the castellations being circumferentially spaced about the axis, the castellations having base and free ends with the base ends integrally formed with the annular body, each castellation having tapered helical thread segments extending along a portion of its axial length, the thread segments formed at positions axially displaced from the thread of the annular body by distances whereby gaps remain between the thread segments of the castellations and the thread of the annular body along the bases of the castellations, the annular body having a second end axially opposite from the first end;
    the castellations being connected to the annular body with sufficient rigidity whereby, upon mounting the locknut to a shaft, the castellations and the annular body pivot together away from the shaft, the annular body and the castellations pivoting about a point within the annular body adjacent the second end of the annular body;
    a first groove formed between the thread of the body and the thread segments of the castellations, the first groove being formed to a depth no more than slightly greater than the depth of adjacent thread segments such that the inclusion of the groove does not substantially affect the rigidity of the castellations with respect to the annular body.

2. The locknut of claim 1, wherein the castellations are inelastically tilted with the free ends thereof radially offset to produce the tapered threads.

3. The locknut of claim 2, wherein the castellations are each tilted by equal amounts.

4. The locknut of claim 1, wherein the first groove, the thread, and the thread segments face the axis of the locknut such that the locknut is externally mountable to a shaft.

5. The locknut of claim 4, wherein the thread and the thread segments have equal thread pitch diameters.

6. The locknut of claim 1, wherein the helical thread extends from the second end of the annular body to a position intermediate the first and second ends, whereby the first groove extends from at least the bases of the castellations to the positions intermediate the first and second ends of the annular body.

7. The locknut of claim 1, wherein the thread segments extend from the free ends of the castellations to positions intermediate the free ends and the base ends, whereby the first groove extends from at least the base ends of the castellations to the positions intermediate the free ends and the base ends.

8. The locknut of claim 7, wherein second grooves extend along the castellations to positions intermediate the free ends thereof and the base ends of the thread segments.

9. The locknut of claim 1, wherein the first groove is symmetric about a plane extending through the base ends of the castellations, whereby the first groove extends equal distances along the castellations and the annular body.

10. The locknut of claim 9, wherein the first groove has an isosceles trapezoidal cross-section along a plane containing to the axis.

11. The locknut of claim 1, having at least three castellations.

12. The locknut of claim 1, wherein the thread and the thread segments have equal pitch.

13. The locknut of claim 12, wherein the first groove has a width along the axis and the width is 1 to 1.5 times the pitch of the thread and the thread segments.

14. The locknut of claim 1, wherein the castellations are of equal size.

15. The locknut of claim 1, wherein the locknut possesses a prevailing torque thread lock.

16. The locknut of claim 1, wherein the locknut includes a lubrication coating to prevent galling between the locknut and a shaft.

17. A locknut having an annular body, rigid castellations having base ends integrally formed with a first end of the body, the castellations extending axially from the body, a helical thread formed along a portion of the body excluding the first end, helical thread segments formed along a portion of the castellations excluding the base ends, and a first groove formed between the helical thread of the body and the helical thread segments of the castellations, the helical thread segments being tapered such that, upon mounting to a shaft having complementary threads, the castellations and the annular body pivot about a point within the annular body adjacent to a second end of the annular body.

* * * * *